(12) United States Patent
Keller

(10) Patent No.: US 7,672,556 B2
(45) Date of Patent: Mar. 2, 2010

(54) FLAT DESIGN COMPOSITE DROP FIBER CABLE WITH MID-SPAN ACCESS CAPABILITY

(75) Inventor: David Keller, Cary, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/805,840

(22) Filed: May 24, 2007

(65) Prior Publication Data

US 2008/0292253 A1 Nov. 27, 2008

(51) Int. Cl.
*G02B 6/44* (2006.01)
(52) U.S. Cl. .................. 385/113; 385/106; 385/111
(58) Field of Classification Search ............... None
See application file for complete search history.

(56) References Cited

U.S. PATENT DOCUMENTS

| | | | |
|---|---|---|---|
| 5,442,722 A * | 8/1995 | DeCarlo | 385/114 |
| 5,737,470 A | 4/1998 | Nagano et al. | 385/114 |
| 6,067,394 A | 5/2000 | Ruello et al. | 385/106 |
| 6,847,767 B2 * | 1/2005 | Hurley et al. | 385/101 |
| 6,928,217 B2 * | 8/2005 | Mohler et al. | 385/113 |
| 7,206,481 B2 * | 4/2007 | Quinn et al. | 385/100 |
| 7,289,704 B1 * | 10/2007 | Wagman et al. | 385/100 |
| 7,391,943 B2 * | 6/2008 | Blazer et al. | 385/100 |
| 7,397,993 B1 * | 7/2008 | Nave et al. | 385/113 |
| 2006/0039659 A1 | 2/2006 | Bocanegra et al. | 385/102 |
| 2006/0291787 A1 | 12/2006 | Seddon | 385/113 |
| 2008/0037946 A1 * | 2/2008 | George et al. | 385/136 |

FOREIGN PATENT DOCUMENTS

| WO | 2005009036 | 1/2005 |
|---|---|---|
| WO | 2006130484 | 12/2006 |

* cited by examiner

*Primary Examiner*—Tina M Wong
(74) *Attorney, Agent, or Firm*—Sofer & Haroun, LLP

(57) ABSTRACT

A fiber cable having a first fiber containing portion with a plurality of optional fibers disposed therein. A second strength portion is separable from the first fiber containing portion arranged in a substantially flat arrangement. The second strength portion is separatably coupled to the first fiber containing portion.

17 Claims, 8 Drawing Sheets

PRIOR ART

US 7,672,556 B2

FLAT DESIGN COMPOSITE DROP FIBER CABLE WITH MID-SPAN ACCESS CAPABILITY

FIELD OF THE INVENTION

The present invention relates to the field of fiber optic cables. More particularly, the present invention relates to an improved flat design composite drop fiber optic cable having mid-span access capability.

BACKGROUND OF THE INVENTION

With the addition of more home fiber optic services, fiber optic cables, such as telephone and internet access fiber cables, are commonly hung from telephone poles and extend to the houses which they service. These cables are typically hung using a variety of clamps such as P-clamps (having a shell bail shim and wedge component). These P-clamps assist in suspending the fiber cable by attaching the fiber cable to hooks located on the poles and on the house or apartment building.

These clamps transmit pressure on fibers within the fiber tubes in a fiber cable if the cable design is oval. Furthermore, the non-rectangular (flat) design may result in the wedge and shims of the clamp rolling or bending under the curves of the cable, causing the edges to pull away from the guide slots resulting in clamp failure.

Alternative flat cables are available, however, one major problem with this common flat design drop cable installation is that the fiber cable is subject to a high amount of tension between the two clamps in the span from the telephone pole to the house. Currently used flat drop fiber cable designs, typically sandwich the fiber portions of the cable between the strength portions of the cable. Such arrangements cause the fiber tube portion of the cable to be crushed when attached to the clamps, when tighter clamp tension is applied. This "loose sandwich" approach may result in minimal adhesion and coefficient of friction transfer to the strength members.

For example, as shown in FIG. 1(*a*)-1(*f*), prior art designs typically include a tube containing optical fibers surrounded by a jacket flanked on both sides by strength members. Also shown in FIG. 1(*b*), another prior art design includes additional strength members set off to the side of the cable. Some prior art arrangements shown in FIGS. 1(*c*) and 1(*d*) also employ yarns added around the rigid strength members in an attempt to add strength to the design. However, these yarns have the effect of further reducing the jacket's adhesion to the constituents, thereby reducing the efficiency of the clamp-fiber cable assembly.

Another drawback associated with the prior art designs shown in FIGS. 1(*a*)-1(*f*) is that they require that the jacket be applied loosely around the strength members so as not to lock in the tube too tightly. If the jacket is too loose in such designs, the fiber cable and clamp connection may fail with the jacket tearing away from the cable constituents underneath within the clamp or at the exit of the clamp.

Yet another drawback with the prior art designs as shown in FIGS. 1(*a*)-1(*f*) is that they require that an installer disassemble the strength portion of the cable in order to access the optical fibers. The center tube configuration of these prior art designs, where the tube containing the optical fibers is located centrally in between the strength members, requires that the cable be destroyed for mid-span access of the fiber.

As such, these prior art designs lack sufficient strength due to P-clamp space constraints and may fail within spans of, or in excess of, 150 feet in heavy wind and ice load.

OBJECTS AND SUMMARY OF THE INVENTION

The present invention provides an improved flat design composite drop fiber cable having a tube containing fibers, set off to the side of the strength members. The fiber containing tube portion of the flat design drop cable is attached adjacent to the strength members on one side. Such an arrangement allows the installer to use just the strength portion of the cable to connect to the pole and house clamps (high tension portion) and can merely tear off the fiber tube portion in order to attach the low tension house and pole connections to the transmission equipment, while also allowing mid-span access to the optical fibers without the need to completely disassemble the strength portion of the cable. Furthermore, the flat design of the strength portion of the cable makes the cable ready for use with the existing P-clamps or wedges (which have two flat shaped clamping sides).

To this end, the present invention is directed to a fiber cable having a first fiber containing portion having a plurality of optional fibers disposed therein, a second strength portion separable from the first fiber containing portion arranged in a substantially flat arrangement. The second strength portion is separatably coupled to the first fiber containing portion.

DETAILED DESCRIPTION

Figure 1A:
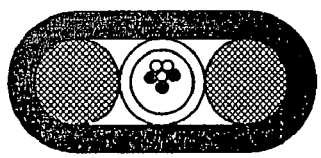
FIGS. 1(*a*)-1(*f*) illustrate a variety of prior art flat design drop cables.
Figure 1B:
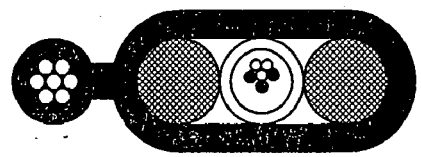
Figure 1C:
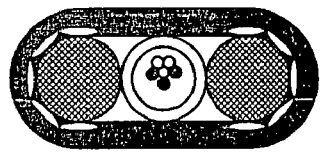
Figure 1D:
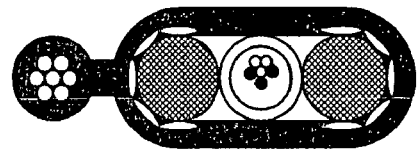
Figure 1E:
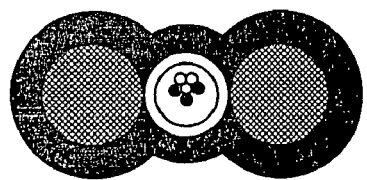
Figure 1F:
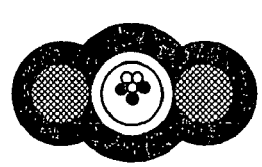
Figure 2A:
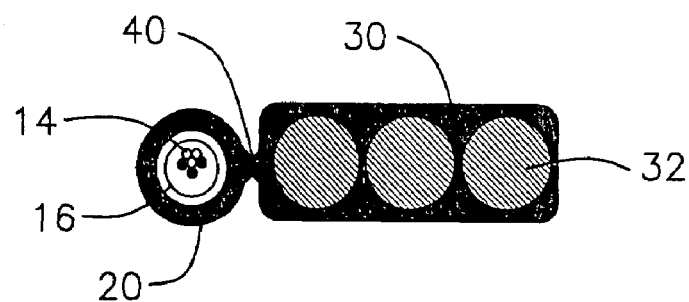
FIGS. 2A and 2B are cross sectional views of fiber cables in accordance with one embodiment of the present invention.
Figure 2B:
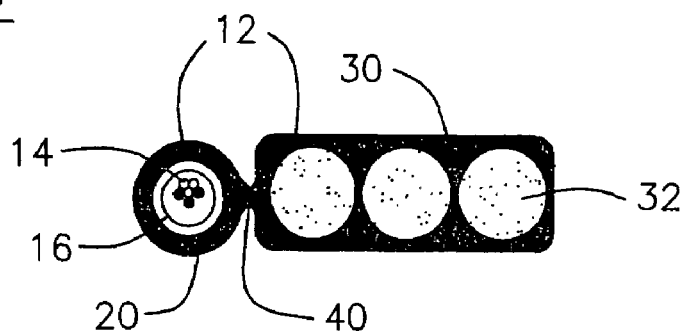

In one aspect as illustrated in FIGS. 2A and 2B an arrangement for a cable 10 is shown having an outer jacket 12 having a fiber section 20 and a strength section 30. Cable 10 is of a flat design type for accommodation within standard clamp designs. In FIG. 2A, fiber section 20 of jacket 12 includes a plurality of fibers 14 within a fiber tube 16. Strength section 30 includes a plurality of strength members 32. Between strength section 30 and fiber section 20, jacket 12 maintains a fiber disconnect notch 40, that is significantly smaller than the outer dimensions of the fiber portion 20 and strength portion 30 of jacket 12 allowing fiber portion 20 to be easily disconnected from strength portion 30.

It is understood that the number of fibers 14 in tube 16 are preferably 6, but the invention is not limited in that respect. Several tube designs may be used for tube 16 including additional components including but not limited to gel filler, dry with SAP (super absorbent powder), or yarns having SAP (not shown).

Furthermore, FIGS. 2A and 2B show the preferable arrangement of three strength members 32. However, the invention is not limited in this respect. More or less strength members may be used depending on the desired specifications, provided the resulting cable 10 is still within usable physical size constraints. In FIG. 2A strength members 32 may be formed of a metal (steel, etc . . . ). As shown in FIG. 2B, strength members 32 may be formed of a fiber/plastic material such as aramid fiber, fiberglass, thermosetting resin, dielectric composite, epoxy and/or GRP (Glass Reinforced Plastic), or some combination thereof.

The dimensions of cable 10 are preferably compatible with existing clamps used for pole and home side connections. For examples, typical clamps are configured to accommodate either 0.500" width cable or 0.630" cables. Thus, cable 10 would be dimensioned to have a width of equal or lesser value, preferably in the range of 80-90% of the interior width of the clamp to prevent the interior bending or curvature of the wedge or grip shims.

One exemplary dimension for cable 10 is substantially 0.500" wide and 0.160"-0.180" inches thick. Of this, strength portion 30 is substantially 0.300" wide and the remaining width encompasses fiber portion 20 and disconnect notch 40. In another example, if increased flexibility is Desired, the overall width may reduced to 0.300"-0.320". Preferably, the thickness of notch 40 is in the range of 60% +/−5-10% of the thickness of the portion of jacket 12 adjacent to notch 40. Such a range is useful for maintaining the connection between fiber portion 20 and strength portion 30, while being reduced enough to allow separation of the two without damaging the near by areas of jacket 12 along strength portion 30 and fiber portion 20.

Figure 3A:
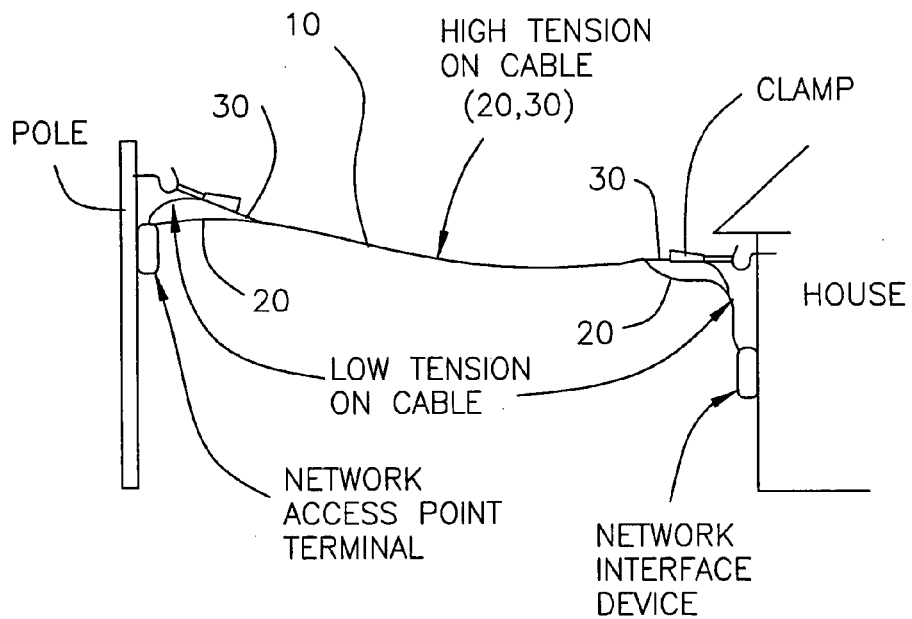
FIGS. 3A and 3B is an illustration of a fiber cable installation.

As shown in FIG. 3A, the above described arrangement allows the strength portion 30 of cable 10 to be utilized in between the clamps on the house and pole sides (under high tension), and beyond the clamps, fiber portion 20 free from any imparted tension, may be separated by cutting/ripping fiber disconnect notch 40, just before the clamps for attachment to the fiber communication equipment (under low tension). Additionally, such an arrangement, by separating the fibers to the separatable fiber portion 20, allows an installer to achieve mid-span access of fibers 14 at any point along cable 10 without the need to damage or unwind any portion of strength members 32 in the separate strength portion 30 of jacket 12.

Figure 3B:
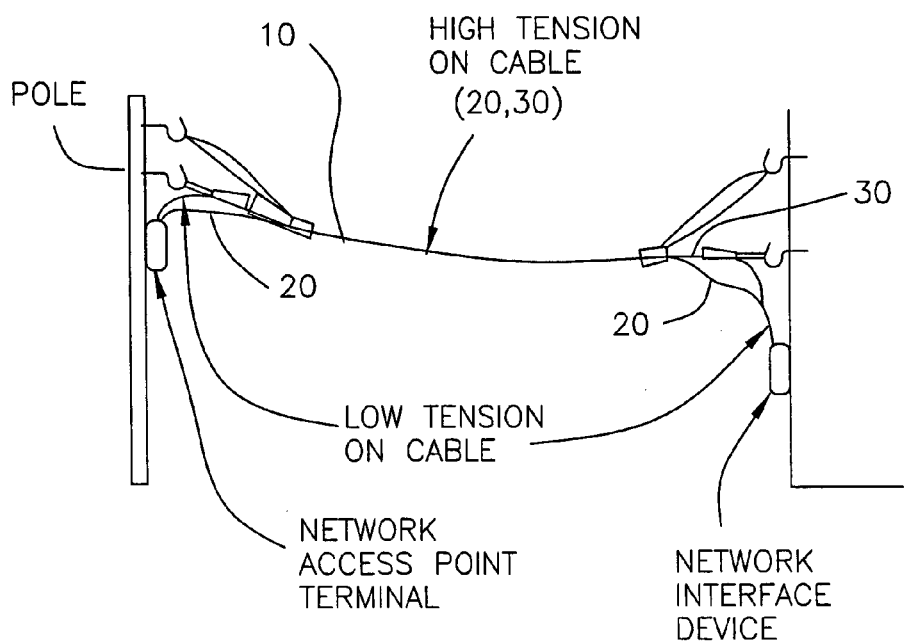

In another aspect, FIG. 3B shows a different installation whereby four clamps are used, two on the pole side and two on the home/building side. Such an arrangement may be used in installations where high wind/ice conditions are expected. Here a first clamp from the pole and a first clamp from the building attach to cable 10 as a whole. Then a second clamp closer to the house, and second clamp closer to the pole is attached similar to the first arrangement where fiber portions 20 are disconnected prior to the clamps which grip only against strength portions 30. This allows the brunt of the tension to be supported by the two second clamps (attached only to strength portions 30) with the first set of clamps (attached to all of cable 10) to provide additional support and to maintain the connection in the case of the failure of one clamp in wind or ice conditions.

Figure 4A:
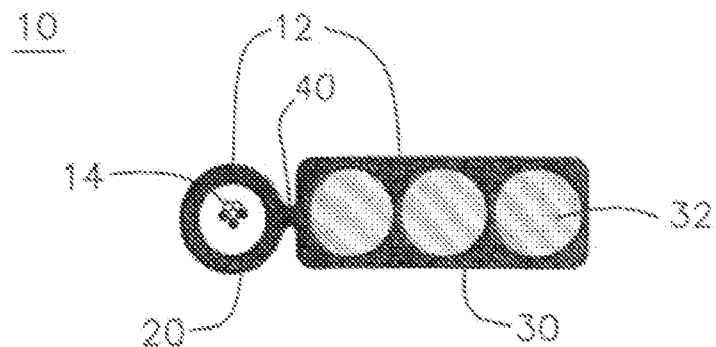
FIGS. 4A and 4B are cross sectional views of fiber cables in accordance with one embodiment of the present invention.
Figure 4B:
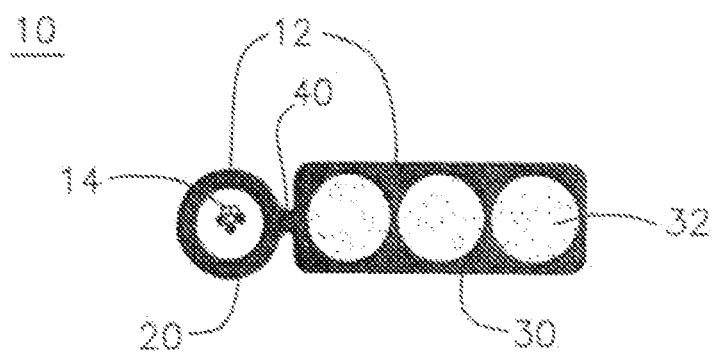
Figure 4C:
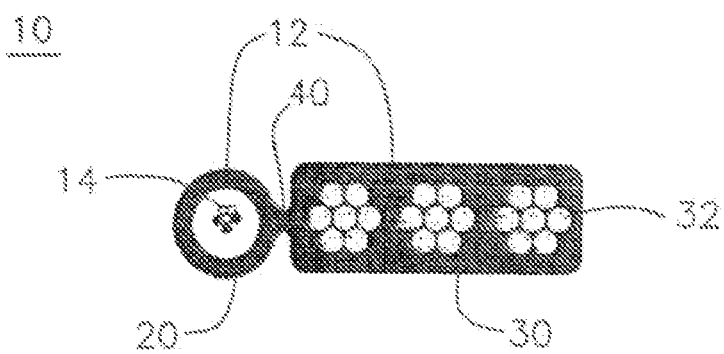

In another aspect, FIGS. 4A-4B, illustrate alternative arrangements for cable 10. In FIGS. 4A-4B, rather than encasing fibers 14 within (a separate jacket 18) tube 16, fibers 14 are simply held within an open space in fiber portion 20 of jacket 12. Furthermore, FIG. 4C shows an alternative arrangement for strength members 32 that employ a plurality of stranded aramid/GRP fibers rather than single composite (thicker) strength fibers to add flexibility to strength portion 30 so as to avoid fracture conditions over very tight bend radii.

Figure 5:
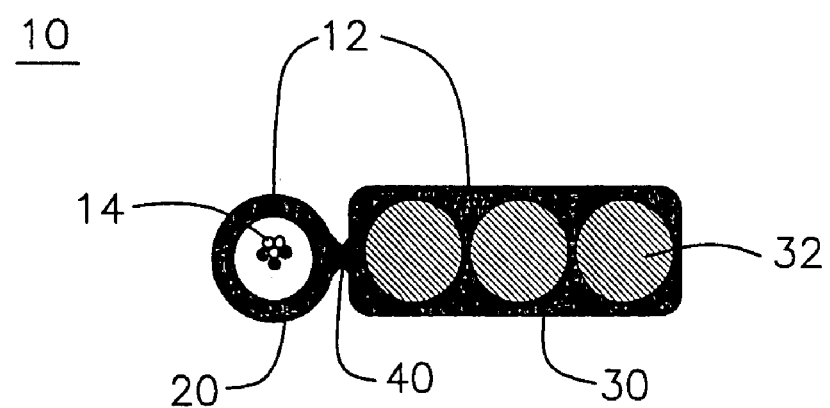
FIG. 5 is a cross sectional view of a fiber cable in accordance with one embodiment of the present invention.

In another aspect, FIG. 5 shows reduced size GRP strength members 32 in strength portion 30 so that polymer used to form jacket 12 entirely encases/envelops strength members 32 rather than in the above example in FIG. 4B. Such an arrangement prevents breakout of strength members 32 through jacket 12 over long term exposure to wind and ice. Furthermore, the lateral support of strength members 32 by jacket 12 reduce fracture incidents when subjected to very small bend radii.

Figure 6A:
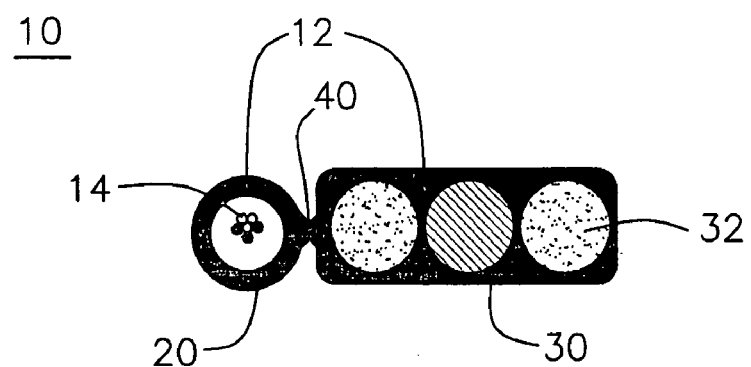
FIGS. 6A and 6B are cross sectional views of fiber cables in accordance with one embodiment of the present invention.
Figure 6B:
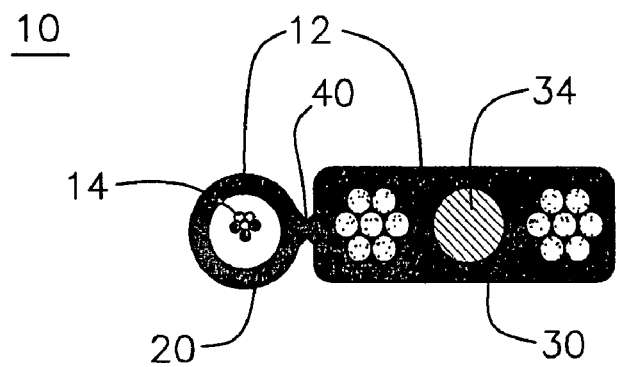

In another aspect, FIGS. 6A and 6B, show an alternative strength portion 30 arrangement whereby strength portions 30 each have two strength members 32 disposed one on either side of a central metal conductor 34. In FIG. 6A, strength members 32 are large single GRP/composite materials. In FIG. 6B, strength members 32 are a grouping of smaller diameter GRP/composite materials. In another arrangement, one or more of strength members 32 may be formed from a metallic/conductor so that they can act as both strength member 32 and conductor 34.

In such, an arrangement, cable 10 may not only be utilized for fiber connection from pole to house using fiber portion 20 but also a power connection from pole to house using central conductor 34 in strength portion 30, for example to provide a 60 volt power backup for the fiber equipment in the event of a power failure from the primary supply. It is understood that any use for power from conductors 34 in cable 10 is within the contemplation of the present invention.

Figure 7A:
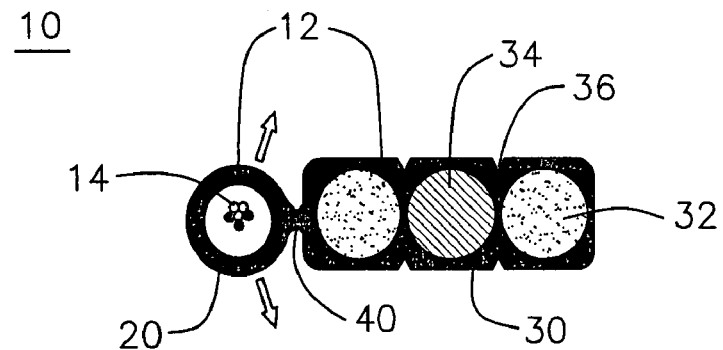
FIGS. 7A, 7B and 7C are cross sectional views of fiber cables in accordance with one embodiment of the present invention.
Figure 7B:
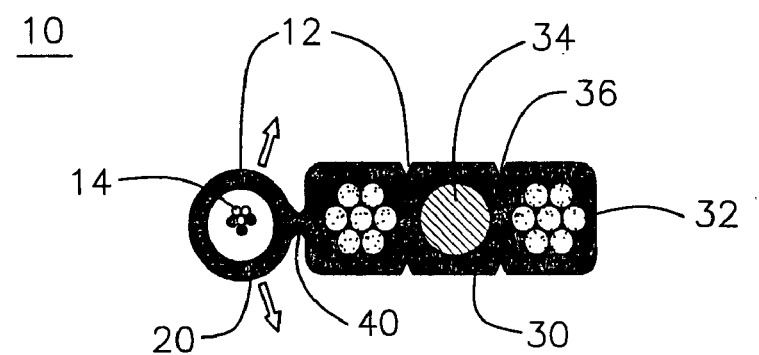
Figure 7C:
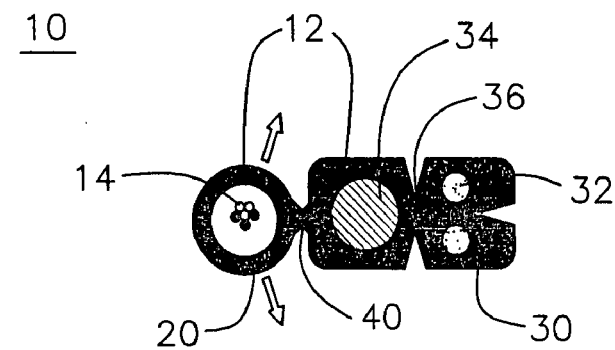

In another aspect, as shown in FIGS. 7A through 7C, strength section individual separation notches 36 are added to the arrangements from FIGS. 6A and 6B so that an installer may separate either one of strength members 32 or conductor 34 so as to be able to better fit cable 10 within the desired clamps and to potentially separate conductor 34 to other connection points on the pole and house ends. Such separation notches 36 can be used on any of the previously described designs; 2A, 2B, 4A-4C, 5, 6A, and 6B or on other designs used for more flexibility in strength member 32 usage, such as the arrangement shown in FIG. 7C.

Figure 8A:
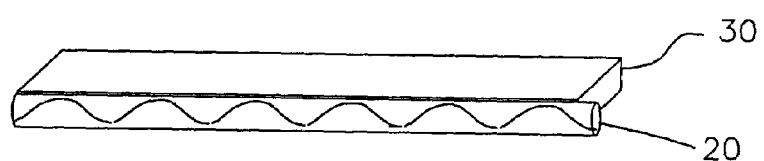
FIGS. 8A and 8B are side elevational views of fiber cables in accordance with one embodiment of the present invention.
Figure 8B:
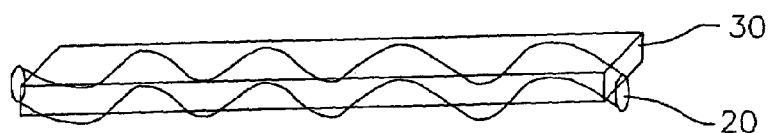

In another arrangement, fiber portion 20 may be extruded in a waved arrangement so as to additionally reduce fiber strain during installation. For example, FIG. 8A shows a typical side elevation arrangement for cable 10, with fiber portion 20 in a standard flat configuration. Alternatively, FIG. 8B shows an oscillated arrangement for fiber portion 20. In this arrangement, fibers 14 in fiber portion 20 have an additional amount of slack relative to the length of strength portion 30. This arrangement provides additional protection for fibers 14 during the high tension installation between the clamps by allowing more length/freedom for installation without incurring any attenuation due to bending or other installation stresses.

As such, the above arrangements allow the fiber portion 20 to be separated from cable 10 just prior to the P clamp allowing the clamp to compress only strength members 32 in strength portion 30. In this way utilization of the P clamp is optimized with respect to the level of adhesion and coefficient of friction caused between strength members 32 and jacket 12 without damaging fibers 14. This arrangement allows for increased usage in longer spans between home/apartments and the poles from which they originate. Furthermore, the arrangement allows for mid-span access of fibers 14 potentially allowing a single drop cable 10 to support several houses on the same street while also potentially providing back-up power in the event of a power failure.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A fiber cable, said fiber cable comprising:
   a first fiber containing portion having one or more fibers disposed therein;
   a second strength portion separable from said first fiber containing portion arranged in a substantially flat arrangement; and
   said second strength portion is separatably coupled to said first fiber containing portion by a fiber separation notch for separatably coupling said fiber portion to said strength portion, wherein said fiber separation notch is dimensioned such that when said first fiber containing portion is separated from said second strength portion, insulation on said first fiber containing portion remains intact.

2. The fiber cable as claimed in claim 1, wherein said strength portion is configured to support said fiber cable between mounting clamps in an installation.

3. The fiber cable as claimed in claim 2, wherein said fiber containing portion is separated from said strength portion before said mounting clamps, free from the tension generated by said installation between said clamps.

4. The fiber cable as claimed in claim 3, wherein said cable is clamped by a second set of clamps around the entirety of said cable in addition to said strength portion being separated from said fiber portion for clamping of said strength portion alone.

5. The fiber cable as claimed in claim 1, said fiber containing portion housing a plurality of fibers.

6. The fiber cable as claimed in claim 5, wherein said plurality of fibers are disposed within a fiber tube.

7. The fiber cable as claimed in claim 5, wherein said plurality of fibers are held within an open space in said fiber portion.

8. The fiber cable as claimed in claim 1, wherein said strength portion houses a plurality of strength members.

9. The fiber cable as claimed in claim 8, wherein said strength members are metal.

10. The fiber cable as claimed in claim 8, wherein said strength members are GRP fibers.

11. The fiber cable as claimed in claim 10, wherein said strength members are reduced size GRP fibers.

12. The fiber cable of claim 8, wherein one of said strength members is a conductor.

13. The fiber cable of claim 1, further comprising separation notches in between said strength members.

14. The fiber cable of claim 1, wherein said fiber containing portion is oscillated relative to said strength portion so that for any length of said cable, fiber containing portion is longer relative to said strength portion.

15. The fiber cable of claim 2, wherein the width of said fiber cable is preferably in the range of 80% to 90% of the interior width of the clamp.

16. The fiber cable as claimed in claim 1, wherein said separation notch is substantially in the range of 50%-70% of the thickness of said insulation adjacent to said separation notch.

17. The fiber cable as claimed in claim 16, wherein said separation notch is substantially 60% of the thickness of said insulation adjacent to said separation notch.

* * * * *